(12) United States Patent
Murayama

(10) Patent No.: US 7,237,659 B2
(45) Date of Patent: Jul. 3, 2007

(54) DISK BRAKE FOR A VEHICLE

(75) Inventor: Yasushi Murayama, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 154 days.

(21) Appl. No.: 11/046,229

(22) Filed: Jan. 31, 2005

(65) Prior Publication Data
US 2005/0194223 A1    Sep. 8, 2005

(30) Foreign Application Priority Data
Mar. 5, 2004    (JP) .............................. 2004-062341

(51) Int. Cl.
*F16D 55/00* (2006.01)
*F16D 65/04* (2006.01)

(52) U.S. Cl. ................................. 188/73.35; 188/73.31

(58) Field of Classification Search ............ 188/250 B, 188/250 G
See application file for complete search history.

(56) References Cited

U.S. PATENT DOCUMENTS

| D336,882 S | * | 6/1993 | Steinke et al. ............. D12/180 |
| D338,648 S | * | 8/1993 | Steinke et al. ............. D12/180 |
| D346,998 S | * | 5/1994 | Steinke et al. ............. D12/180 |
| D354,265 S | * | 1/1995 | Steinke et al. ............. D12/180 |
| 5,975,252 A | | 11/1999 | Suzuki et al. |
| 6,105,736 A | | 8/2000 | Akita et al. |
| 6,170,620 B1 | * | 1/2001 | Akita et al. ............. 188/251 A |
| 6,206,147 B1 | | 3/2001 | Yoshida et al. |
| 6,257,379 B1 | * | 7/2001 | Matsumoto et al. ..... 188/73.31 |
| 2003/0213658 A1 | * | 11/2003 | Baba ........................ 188/73.37 |
| 2004/0163903 A1 | * | 8/2004 | Saka ........................ 188/250 G |
| 2006/0027427 A1 | * | 2/2006 | Anda et al. ................ 188/73.1 |

FOREIGN PATENT DOCUMENTS

| JP | 4-138137 U | 12/1992 |
| JP | 2003-329067 A | 11/2003 |
| JP | A 2003-329067 | 11/2003 |

* cited by examiner

Primary Examiner—Christopher P. Schwartz
(74) Attorney, Agent, or Firm—Oliff & Berridge, PLC

(57) ABSTRACT

A disk brake is disclosed that has a shim between a brake pad and a pressuring element for pressing the brake pad against a disk rotor. The disk brake includes a stopper portion for stopping movement of the shim 70 with respect to the brake pad 50, wherein a point of action on the shim the stopper portion acts on is provided at the downstream side in a rotating direction of the disk rotor 14 with respect to a point of action on the shim the pressuring element acts on.

21 Claims, 4 Drawing Sheets

DISK ROTOR ROTATING DIRECTION

DISK BRAKE FOR A VEHICLE

TECHNICAL FIELD

The present invention relates to a disk brake that has a pressuring element provided for pressing a brake pad against a disk rotor via a shim so as to generate a braking force.

BACKGROUND ART

In the state of art, a disk brake is well-known that has a shim (shim plate) for anti-brake shudder provided between a back metal of a brake pad and a pressuring element (a piston or a pawl portion of a cylinder) for pressing the brake pad against a disk rotor. JP2003-329067 A discloses this type of a disk brake, in which on the shim are formed a plural of projections (dimples) so as to establish contact between the pressuring element and the projections of the shim under a low pressuring force at a low braking force. JP4-138137 A discloses a technique for reducing brake shudder by providing a shim on a back metal such that the shim can move with respect to the back metal and thus permitting movement of the shim with respect to the back metal during a braking operation.

In general, on such type of a disk brake are provided stoppers for limiting the range of the movement of the shim in order to prevent unlimited movement of the shim with respect to the back metal. For example, in a structure in which the shim has hooks hooked at the perimeter of the back metal, on the perimeter of the back metal are formed wall portions for limiting the movement of the hooks beyond a predetermined amount. With such a structure, forces are applied to the shim by the pressuring element and the wall portion during a braking operation; however, depending on a positional relationship between points of action of these forces, non-uniformity in the distribution of pressuring forces on the shim applied by the pressuring element may occur, causing a bottleneck in reducing brake shudder.

DISCLOSURE OF INVENTION

It is an object of the present invention to provide a disk brake in which brake shudder is efficiently reduced.

In order to achieve the above-mentioned objects, according to one aspect of the present invention a disk brake is provided that has a pressuring element provided for pressing a brake pad against a disk rotor via a shim during a braking operation, comprising: a stopper portion that acts on the shim for stopping a movement of the shim with respect to the brake pad, wherein a point of action of the stopper portion on the shim is provided at the downstream side in a rotating direction of the disk rotor with respect to a point of action of the pressuring element on the shim.

In this aspect of the invention, it is advantageous if two stopper portions are provided, each stopper portion being provided according to a different direction of the disk rotor, and points of action of the stopper portions on the shim are provided symmetrically in a rotating direction of the disk rotor with respect to a point of action of the pressuring element on the shim.

Other objects, features and advantages of the present invention will become more apparent from the following detailed description when read in conjunction with the accompanying drawings.

BEST MODE FOR CARRYING OUT THE INVENTION

Hereafter, the preferred embodiments according to the present invention are explained with reference to the drawings.

Figure 1:
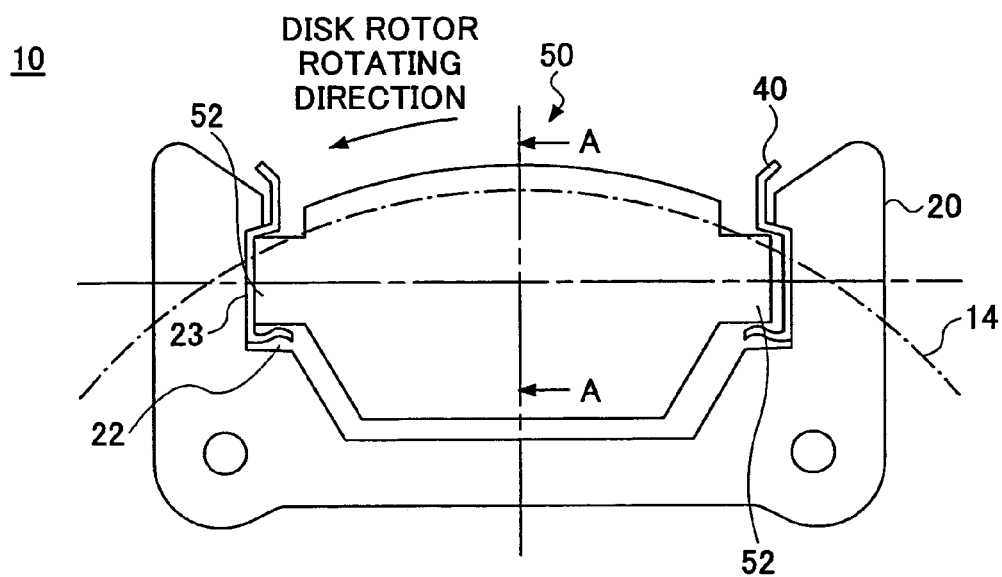
FIG. 1 is a plan view of a disk brake according to an embodiment of the present invention.
Figure 2:
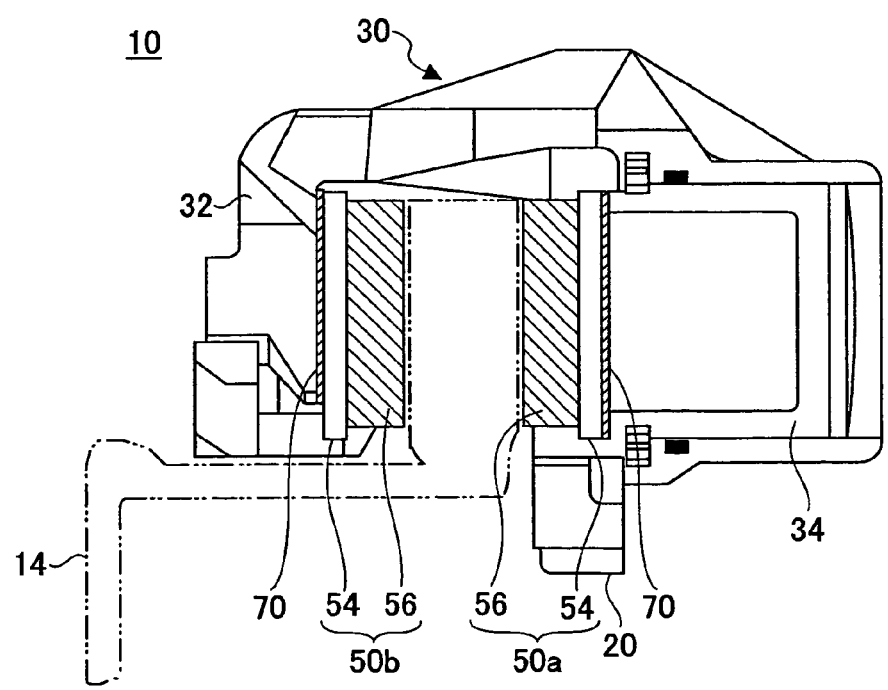
FIG. 2 is a cross-sectional view A—A in FIG. 1.

FIG. 1 is a plan view of a disk brake 10 according to an embodiment of the present invention, and FIG. 2 is a cross-sectional view A—A in FIG. 1. In FIG. 2, a cylinder body (caliper) is not shown for illustrating the inside of disk brake 10.

The disk brake 10 according to this embodiment has a mounting bracket 20 (hereafter referred to as simply "mounting 20") that is mounted to a vehicle body. On the mounting 20 is supported brake pads 50 (an inner pad 50a and an outer pad 50b) via pad clips 40. The inner pad 50a and the outer pad 50b are arranged such that they sandwich a disk rotor 14, which rotates together with a wheel, from inboard and outboard sides, respectively, of the vehicle.

The brake pads 50 are provided with friction materials 56 that are pressed on sliding surfaces of the disk rotor 14, and on the back sides of the friction materials 56 (the back side is determined assuming that the side opposed to the disk rotor 14 is the front side) are provided back metals (back plates) 54, as shown in FIG. 2. The back metals 54 of the brake pads 50 are provided with convex portions 52 on both ends in a rotating direction of the disk rotor 14, as shown in FIG. 1. The convex portions 52 of the back metals 54 are supported via pad clips 40 in concave portions (channels) 22 formed in the mounting 20. It is noted that the pad clips 40 may support the convex portions 52 of the back metals 54 such that the convex portions 52 are floated in the concave portions 22 of the mounting 20. In the embodiment illustrated in FIG. 1, the convex portions 52 of the back metals 54 are supported such that they can move in an inner radial direction of the disk rotor 14.

The disk brake 10 has a cylinder body 30 (hereafter referred to as simply "cylinder 30"), as shown in FIG. 2. The cylinder 30 is attached to the mounting 20 via a slide pin or the like (not shown). Specifically, the cylinder 30 is supported on the mounting 20 via a slide pin with bushings that crosses the disk rotor 14 in the direction between inboard and outboard sides of the vehicle. The cylinder 30 has a piston 34 and a pawl portion 32 arranged such that they sandwich the inner pad 50a and the outer pad 50b from inboard and outboard sides, respectively, of the vehicle. Typically, the cylinder 30 is connected in fluid communication with a brake master cylinder (not shown) via pressured fluid channels. When the high pressure fluid is supplied to the cylinder 30, the piston 34 moves toward the pawl portion 32. In this way, the inner pad 50a and the outer pad 50b are pressed toward each other by the piston 34 and the pawl portion 32 so that the inner pad 50a and the outer pad 50b pinch both sliding surfaces of the disk rotor 14, generating a braking force. It is noted that the disk brake 10 may be arranged in any angular positions in a circumferential direction of the wheel.

On the back sides of the back metals 54 of the brake pads 50 are provided shims 70 described later, as shown in FIG. 2. The piston 34 or the pawl portion 32 is abutted and pressed on the back side of shim 70. Thus, the inner pad 50a and the outer pad 50b are subjected to pressuring forces from the piston 34 or the pawl portion 32 toward the disk rotor 14 via the respective shims 70.

Figure 3:
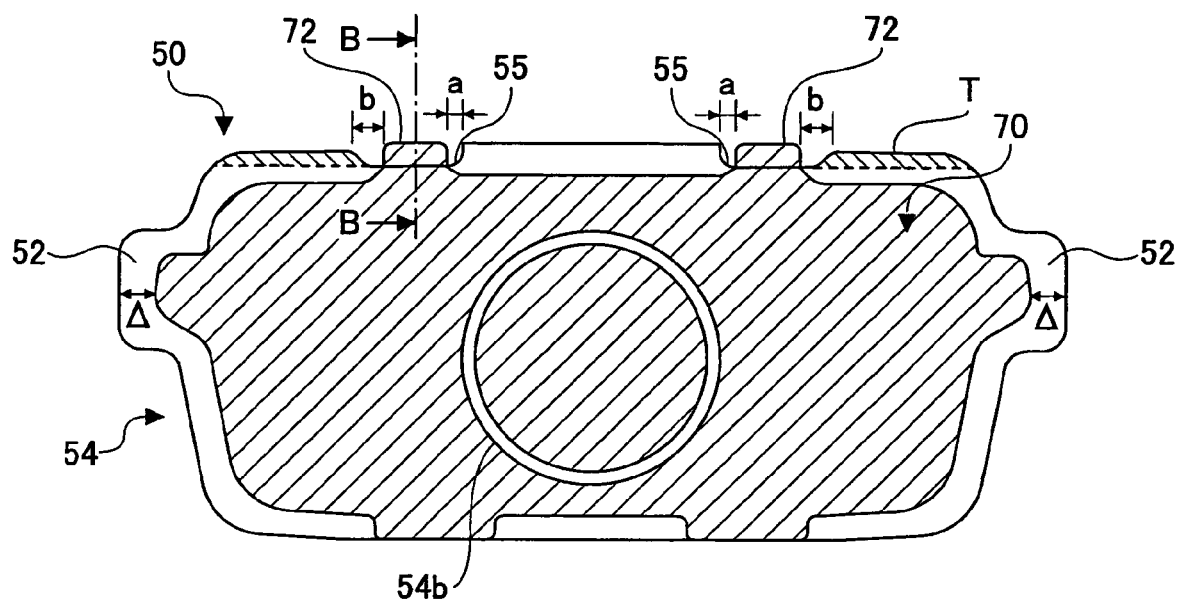
FIG. 3 is a plan view of a shim 70 on a brake pad according to the embodiment.
Figure 4:
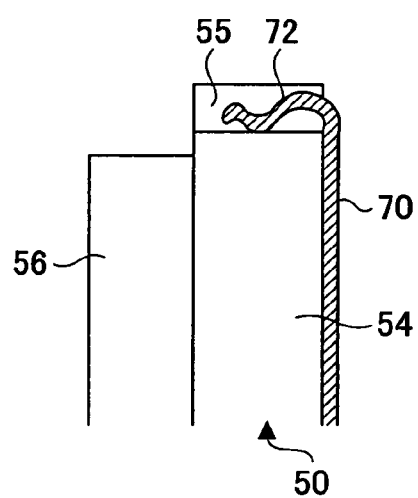
FIG. 4 is a cross-sectional view B—B in FIG. 3.

FIG. 3 is a plan view of a shim 70 on a brake pad according to the embodiment. FIG. 4 is a cross-sectional view B—B in FIG. 3. It is noted that explanation is made below for only the arrangement on the side related to the inner pad 50a, since there is substantially no difference with respect to the arrangement on the side related to the outer pad 50b.

The shim 70 is arranged on the back surface of the back metal 54 of the brake pads 50 such that the shim 70 covers substantially all the area of the back metal 54 except the peripheral area thereof, as shown in FIG. 3. On the perimeter of the shim 70 are formed hook (nail) portions 72. The hook portions 72 are supported such that they can move with respect to the back metal 54 in a plane that is parallel with a basic plane of the back metal 54, in particular, in the direction that substantially corresponds to the rotating direction of the disk rotor 14 (a lateral direction in FIG. 3). Specifically, the hook portions 72 of the shim 70 are hooked to concave portions (channel portions) 55 that are formed on the perimeter of the back metal 54, and movably retained in the concave portions 55, as shown in FIG. 4. In the embodiment illustrated in FIG. 3, the hook portions 72 are located on the outside of a contact portion 54b that contacts the piston 34 (i.e. a pressuring portion 54b of the piston 34), and two hook portions 72 are provided symmetrically in the rotating direction of the disk rotor 14 with respect the pressuring portion 54b. However, the hook portions 72 are not necessarily formed symmetrically with respect the pressuring portion 54b, and more than three hook portions 72 may be provided.

Similarly, the hook portions 72 are located on the outside of a contact portion with the pawl portion 32 (i.e. a pressuring portion of the pawl portion 32), and two hook portions 72 are provided symmetrically in the rotating direction of the disk rotor 14 with respect the pressuring portion of the pawl portion 32. It is noted that, in the following description, "a pressuring portion of a pawl portion 32" in the arrangement on the side related to the outer pad 50b corresponds to "a pressuring portion 54b of a piston 34", as previously described.

In this embodiment, during the braking operation, the condition is established in which the back metals 54 of the brake pads 50 are pressed on the disk rotor 14 and the shim 70 is pressed on the piston 34. Thus, the back metals 54 of the brake pads 50 can move with respect to the piston 34 as a result of the movement with respect to the shim 70. With such an arrangement, in the conditions wherein the mounting 20 or the cylinder 30 is subjected to deformation, as in the condition during a braking operation with high pressuring force, the back metals 54 of the brake pads 50 can move with respect to the shim 70 and thus follow the deformation of the mounting 20. This leads to improved stabilization in a posture of the brake pads 50 even in such conditions. In this way, brake shudder that tends to occur during the braking operation is efficiently reduced.

However, as the shim 70 moves with respect to the back metal 54 as mentioned above, the shim 70 is finally stopped when the hook portion 72 is abutted against a side wall of the concave portion 55, restraining the movement of shim 70 with respect to the back metal 54. When a further load urges the shim 70 in this restraint condition of the movement to move further, forces from the pressuring portion 54b of the piston 34 and from the hook portion 72 that has been stuck by the side wall of the concave portion 55 act on the shim 70. At this time, depending on a positional relationship between points of action of these forces, an undesired deformation, such as a lifting deformation, may occur in some cases. In such cases, non-uniformity in a distribution of the pressuring force applied by the pressuring portion 54b of the piston 34 on the shim 70 occurs, causing brake shudder.

Regarding this problem, according to the present invention, a point of action on the shim 70 of the rotation force of the disk rotor 14 applied via the hook portion 72 is provided at a downstream side (outlet side of the disk rotor 14) in a rotating direction of the disk rotor 14 with respect to a point of action on the shim 70 of the pressuring force applied by the pressuring portion 54b of the piston 34. With this arrangement, since the rotation force of the disk rotor 14 applied to the shim 70 via the hook portion 72 acts in a tensile direction in a plane with a fulcrum at the pressuring portion 54b of the piston 34, undesired deformations such as a lifting deformation don't occur around the pressuring portion 54b of the piston 34. Therefore, with this arrangement, a distribution of the pressuring force (a pressure pattern on the shim 70) from the piston 34 doesn't become heterogeneous, enabling to efficiently reduce brake shudder.

Specifically, referring to FIG. 3, at the nominal location of the shim 70 with respect to the back metal 54, the locations of the hook portions 72 within the concave portions 55 of the back metal 54 are biased to the side of the pressuring portion 54b of the piston 34, that is to say, to the center of the back metal 54. In other words, when the shim 70 is in the nominal location, distances "a" between the hook portions 72 and the inner side walls (center side walls) of the concave portions 55 are set smaller than distances "b" between the hook portions 72 and the outer side walls of the concave portions 55.

Figure 5A:
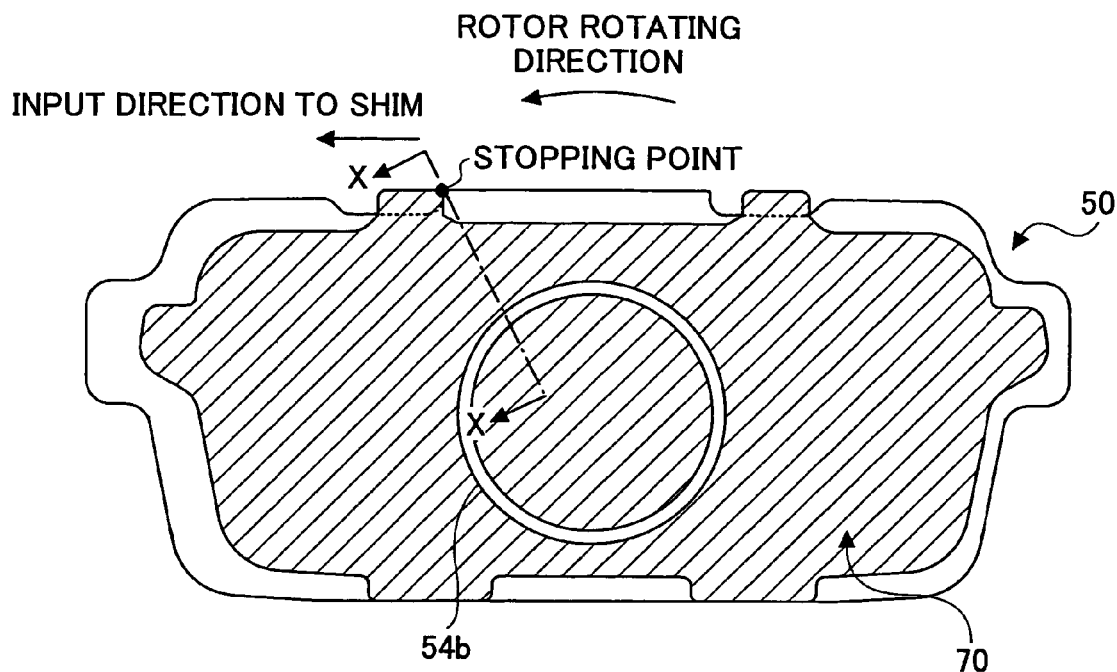
FIG. 5A is an illustration of a status of the shim 70 in its moved position according to the embodiment of the present invention and FIG. 5B is an illustration of a status of the shim 70 in its moved position according to the comparative example.
Figure 6A:
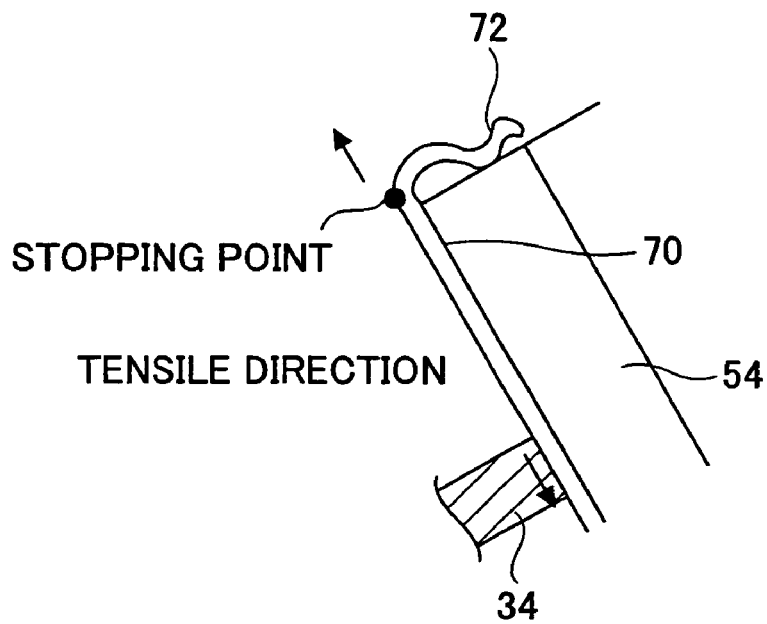
FIG. 6A is an illustration of a status of the shim 70 under the application of a force according to the embodiment of the present invention and FIG. 6B is an illustration of a status of the shim 70 under the application of a force according to the comparative example.

Thus, in this embodiment, as shown in FIG. 5A, at the braking in which the disk rotor 14 rotates in a counterclockwise direction, the shim 70 moves in a right direction with respect to the back metal 54 (i.e. in an opposite direction with respect to the rotating direction of the disk rotor 14), and finally the hook portion 72 located in the left side in the drawing will abut against the center side wall of the concave portions 55 located in the left side in the drawing. Similarly, at the braking in which the disk rotor 14 rotates in a clockwise direction, the hook portion 72 located in the right side will abut against the center side wall of the concave portions 55 located in the right side. In the former case, as shown in FIG. 6A corresponding to the X—X cross-sectional view of FIG. 5A, the shim 70 restrained at the pressuring portion 54b of the piston 34 is subjected to the tensile force (the same goes for the latter case). Thus, it can be seen that undesired deformations of the shim 70 at the pressuring portion 54b of the piston 34 such as a lifting deformation don't occur, resulting in efficient brake shudder reduction.

Figure 5B:
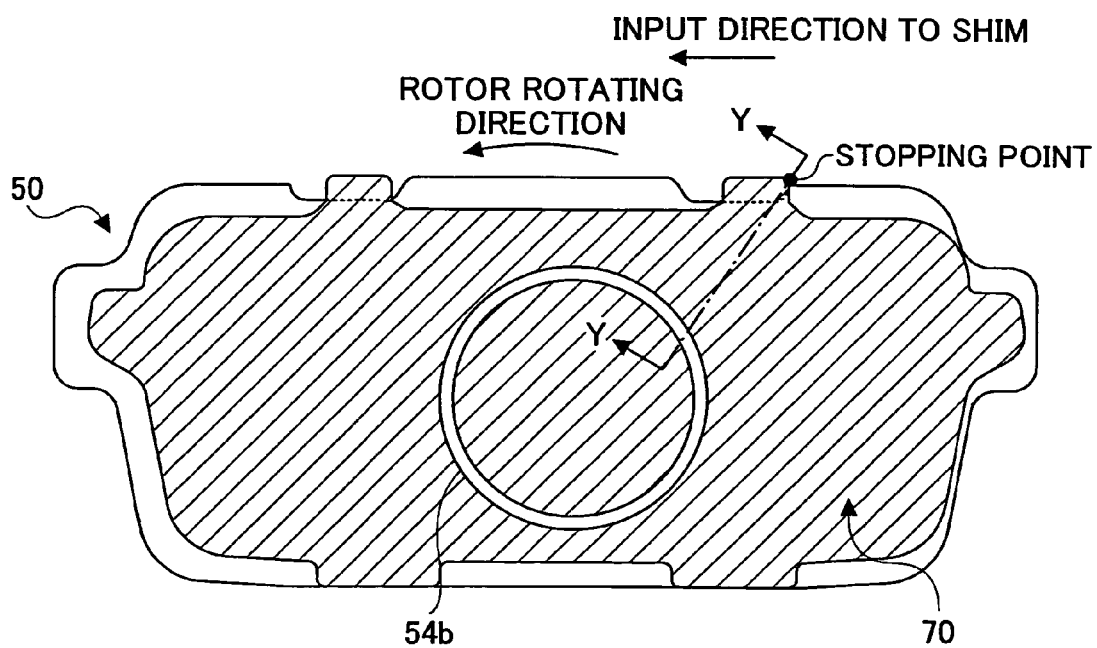
Figure 6B:
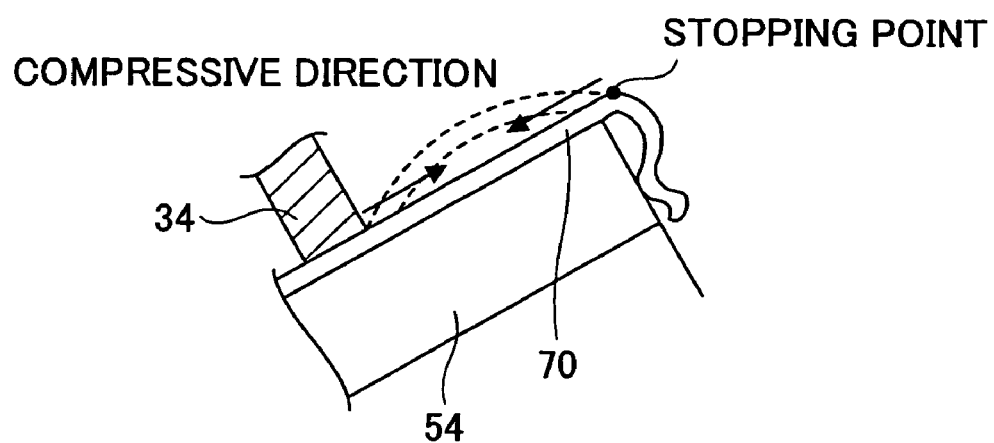

To the contrary, with the arrangement in which the aforementioned distances "a" are set bigger than the distance "b" as opposed to this embodiment, as shown in FIG. 5B, at the braking in which the disk rotor 14 rotates in a counter-clockwise direction, the hook portion 72 located in the right side in the drawing will abut against the outer side wall of the concave portions 55 located in the right side in the drawing. In this case, as shown in FIG. 6B corresponding to the Y—Y cross-sectional view of FIG. 5B, the shim 70 at the pressuring portion 54b of the piston 34 deforms in a lifting direction (as shown by dashed line in the drawing) due to the compressive force generated between the hook portion 72 and the pressuring portion 54b. As a result of this, the pressuring force from the piston 34 will act on the shim 70 in a heterogeneous pattern (the same goes for the case of rotating in the clockwise direction). In other words, in this comparative example, the piston 34 presses the shim 70 in the lifted state, and the postures of the brake pads become unstable, which enhances brake shudder.

As mentioned above, according to the present invention, by appropriately setting points of action of these two forces acting on the shim 70, that is to say, the rotating force of the disk rotor 14 input via the hook portion 72, and the pressuring force input via the pressuring portion 54b, it becomes possible to prevent undesired deformations from occurring around the pressuring portion 54b and thus reduce brake shudder efficiently.

It is noted that gaps Δ between the side edges of the back metal 54 and the side edges of the shim 70 are set such that the side portions of the shim 70 cannot extend off the back metal 54 by considering the movable range of the shim 70 with respect to the back metal 54, as shown in FIG. 3. In other words, the gap Δ is set sufficiently bigger than the movable amount "a" of the hook portion 72 in the concave portion 55 (the distance "a" between the hook portions 72 and the center side wall of the concave portion 55).

The present invention is disclosed with reference to the preferred embodiment. However, it should be understood that the present invention is not limited to the above-described embodiment, and variations and modifications may be made without departing from the scope of the present invention.

For example, although in the above-mentioned embodiment the rim of the back metal 54 formed the concave portions 55, the present invention is not limited to this structure. The present invention covers any structures as long as the stopping force is applied to the hook portion 72 of the shim 70 at the outside of the pressuring portion 54b of the piston 34 and in an outward direction with respect to the pressuring portion 54b. For example, the structure in which the outer side walls of the concave portions 55 are omitted (hatching areas T in the drawing are omitted) is also possible.

Further, although in the above-mentioned embodiment the stoppers between the shim 70 and the back metal 54 are implemented by the hook portions 72 of the shim 70 and the concave portions 55 of the back metal 54, the present invention is not limited to this structure. A structure in which projected portions formed on the shim 70 are inserted or fitted in through holes or concave portions formed in the back metal 54, andr a structure in which projected portions formed on the back metal 54 are inserted or fitted in through holes or concave portions formed in the shim 70 are also possible. In these cases, it is possible to limit the movable range of the projected portion within the through hole, for example, by appropriately setting the size of the through hole, and it is also possible to efficiently reduce the lifting deformation of the shim 70 which is a leading cause of brake shudder, by setting the stopper location for limiting the movement of the projected portion at the downstream side in the rotating direction of the disk rotor 14 with respect to the contact portion of the shim 70 with the piston 34 or the like, as is the case with the aforementioned embodiment.

Further, it is possible to provide a separate shim between the shim 70 and the back metal 54 in the above-mentioned embodiment. In this case, the separate shim (referred to as "an inner shim") may be attached to the back metal 54 such that it cannot move substantially, and thus the inner shim may have a function of easing the slide (movement) of the outer shim 70. In such an arrangement, the same structure as the aforementioned back metal 54 may be provide to the inner shim. In other words, stopper portions for stopping the movement of the shim 70 may be set between the inner shim and the outer shim 70, wherein the stopper portions may apply the stopping force to the outer shim 70 at the outside of the pressuring portion 54b of the piston 34 and in an outward direction (in the rotating direction of the disk rotor 14) with respect to the pressuring portion 54b.

Further, the stopper portions between the back metal 54 and the shim 70 are set at the upper side of the shim 70, that is to say, at the outer side in the radius direction, however, it is also possible to set the stopper portions at the lower side of the shim 70. In this arrangement; in a case where the width of the pressuring portion 54b by the pawl portion 32 is smaller in the lower side of the shim 70 than that in the upper side of the shim 70, it becomes easier to set the stopper portions on the shim 70 at the outside of the pressuring portion 54b of the pawl portion 32 of the cylinder 30.

The invention claimed is:

1. A disk brake that has a pressuring element provided for pressing a brake pad against a disk rotor via a shim movable relative to the brake pad during a braking operation, comprising:
    a stopper portion that acts on the shim for stopping a movement of the shim with respect to the brake pad;
    wherein a point of action of the stopper portion on the shim is at the downstream side in a rotating direction of the disk rotor with respect to a point of action of the pressuring element on the shim; and
    wherein the point of action of the stopper portion is positioned to restrict a compressive force from acting on the shim.

2. The disk brake as claimed in claim 1, wherein the brake pad or the shim has one or more projections which project into a respective hole or concave portion in the other, the or each hole or concave portion having, as a said stopper portion, a wall portion which acts on the associated projection, wherein, for a particular direction of rotation of the disk rotor, the point of action of the brake pad on the shim via a said projection and wall portion is downstream of the point of action of the pressuring element.

3. The disk brake as claimed in claim 2, wherein the said point of action of the brake pad on the shim is such as to apply tensile stress to the shim.

4. The disk brake as claimed in claim 3, wherein the brake pad has one or more concave portions and the shim has one or more hooks which engage the respective concave portions.

5. The disk brake as claimed in claim 4, wherein, when the shim is in its nominal position, a distance (a) between a hook and the stopper portion provided by a first side wall of the concave portion is smaller than a distance (b) between the hook and a second side wall of the concave portion, wherein for the said particular direction of rotation of the disk rotor the said first side wall is upstream of the hook.

6. The disk brake of claim 5, comprising two stopper portions, one for each rotational direction of the disk rotor, the points of action of the stopper portions on the shim being symmetrical with respect to the point of action of the pressuring element on the shim.

7. The disk brake of claim 3, comprising two stopper portions, one for each rotational direction of the disk rotor, the points of action of the stopper portions on the shim being symmetrical with respect to the point of action of the pressuring element on the shim.

8. The disk brake of claim 4, comprising two stopper portions, one for each rotational direction of the disk rotor, the points of action of the stopper portions on the shim being symmetrical with respect to the point of action of the pressuring element on the shim.

9. The disk brake as claimed in claim 2, wherein the brake pad has one or more concave portions and the shim has one or more hooks which engage the respective concave portions.

10. The disk brake as claimed in claim 9, wherein, when the shim is in its nominal position, a distance (a) between a hook and the stopper portion provided by a first side wall of the concave portion is smaller than a distance (b) between the hook and a second side wall of the concave portion, wherein for the said particular direction of rotation of the disk rotor the said first side wall is upstream of the hook.

11. The disk brake of claim 10, comprising two stopper portions, one for each rotational direction of the disk rotor, the points of action of the stopper portions on the shim being symmetrical with respect to the point of action of the pressuring element on the shim.

12. The disk brake of claim 9, comprising two stopper portions, one for each rotational direction of the disk rotor, the points of action of the stopper portions on the shim being symmetrical with respect to the point of action of the pressuring element on the shim.

13. The disk brake of claim 2, comprising two stopper portions, one for each rotational direction of the disk rotor, the points of action of the stopper portions on the shim being symmetrical with respect to the point of action of the pressuring element on the shim.

14. The disk brake as claimed in claim 2, wherein the brake pad has a further shim, which is substantially immovable relative to the brake pad, between the brake pad and the said first-mentioned shim.

15. The disk brake as claimed in claim 1, further comprising a further stopper portion, wherein, for a particular direction of rotation of the disk rotor, the said point of action of a said stopper portion on the shim is at the downstream side in the said rotating direction with respect to a point of action of the pressuring element on the shim.

16. The disk brake as claimed in claim 15, wherein the said point of action of the stopper portion on the shim is such as to apply tensile stress to the shim.

17. The disk brake of claim 16, comprising two stopper portions, one for each rotational direction of the disk rotor, the points of action of the stopper portions on the shim being symmetrical with respect to the point of action of the pressuring element on the shim.

18. The disk brake of claim 15, comprising two stopper portions, one for each rotational direction of the disk rotor, the points of action of the stopper portions on the shim being symmetrical with respect to the point of action of the pressuring element on the shim.

19. The disk brake as claimed in claim 1, wherein the said point of action of the stopper portion on the shim is such as to apply tensile stress to the shim.

20. The disk brake of claim 19, comprising two stopper portions, one for each rotational direction of the disk rotor, the points of action of the stopper portions on the shim being symmetrical with respect to the point of action of the pressuring element on the shim.

21. The disk brake of claim 1, comprising two stopper portions, one for each rotational direction of the disk rotor, the points of action of the stopper portions on the shim being symmetrical with respect to the point of action of the pressuring element on the shim.

* * * * *